United States Patent

Hatsios et al.

[11] Patent Number: 5,886,451
[45] Date of Patent: Mar. 23, 1999

[54] WIRE ROUTING DESIGN FOR A ROTOR OF AN ELECTRICAL MACHINE

[75] Inventors: Michael John Hatsios, Plymouth; Richard Kenneth Harris, Walled Lake; Steven John Yockey, Ann Arbor; Michael Timothy York, Chelsea, all of Mich.

[73] Assignee: Ford Motor Company, Dearborn, Mich.

[21] Appl. No.: 960,873

[22] Filed: Oct. 30, 1997

[51] Int. Cl.⁶ .............................. H02K 1/22; H02K 39/08
[52] U.S. Cl. ..................... 310/263; 310/67 R; 310/232; 310/234; 310/235; 29/597
[58] Field of Search .............................. 310/62, 63, 71, 310/67 R, 91, 92, 263, 232, 233, 227, 235, 43; 29/597

[56] References Cited

U.S. PATENT DOCUMENTS

| | | | |
|---|---|---|---|
| 1,888,288 | 11/1932 | Purdy et al. | 310/263 |
| 3,343,113 | 9/1967 | Dougall | 336/192 |
| 3,453,575 | 7/1969 | Davis | 336/192 |
| 3,461,414 | 8/1969 | Fearon et al. | 335/296 |
| 3,470,511 | 9/1969 | Heinzen | 24/130 |
| 3,622,100 | 11/1971 | Wright | 24/130 |
| 3,671,906 | 6/1972 | Hodges et al. | 310/68 |
| 3,785,049 | 1/1974 | Kanaman et al. | 29/624 |
| 4,105,907 | 8/1978 | Hagenlocher et al. | 310/232 |
| 4,114,056 | 9/1978 | Nimura | 310/42 |
| 4,132,913 | 1/1979 | Lautner et al. | 310/68 |
| 4,318,069 | 3/1982 | Morse | 336/192 |
| 4,565,936 | 1/1986 | Ikegami et al. | 310/62 |
| 4,588,915 | 5/1986 | Gold et al. | 310/194 |
| 4,686,399 | 8/1987 | Imori et al. | 310/62 |
| 5,264,816 | 11/1993 | Degenhart et al. | 336/192 |
| 5,325,003 | 6/1994 | Saval et al. | 310/629 |
| 5,543,676 | 8/1996 | York et al. | 310/263 |
| 5,625,244 | 4/1997 | Bradfield | 310/232 |

FOREIGN PATENT DOCUMENTS 2032707  5/1980  United Kingdom.
2050066  12/1980  United Kingdom.

*Primary Examiner*—Thomas M. Dougherty
*Assistant Examiner*—Trann Nguyen
*Attorney, Agent, or Firm*—Mark S. Sparschu

[57] ABSTRACT

A rotor for an electrical machine according to one embodiment of the present invention comprises a shaft defining an axis of rotation of the rotor, and first and second pole pieces affixed to the shaft for rotation therewith and together defining an interior cavity. The rotor additionally includes a slip ring affixed to the shaft for rotation therewith. Further, the rotor comprises a field-generating coil disposed within the interior cavity, the coil comprising a plurality of turns of electrical wire, the electrical wire further having a section extending to and electrically coupled to the slip ring. Also, the rotor has a retainer disposed exterior to the cavity and adjacent the first pole piece, the retainer comprising a radially-extending channel containing a portion of the section of electrical wire.

11 Claims, 3 Drawing Sheets

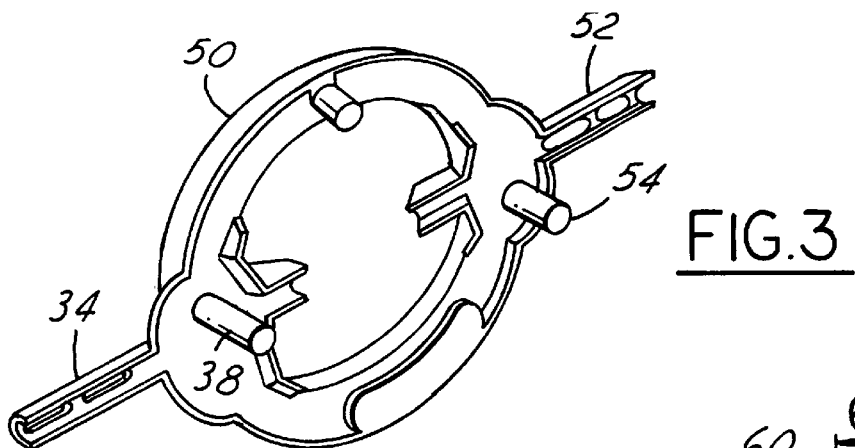
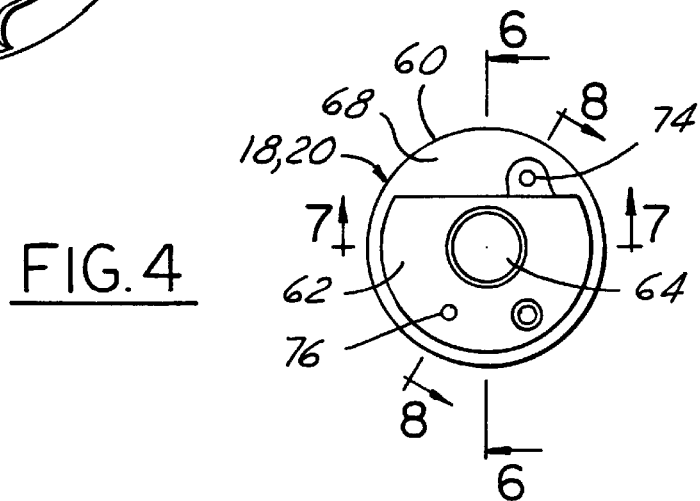
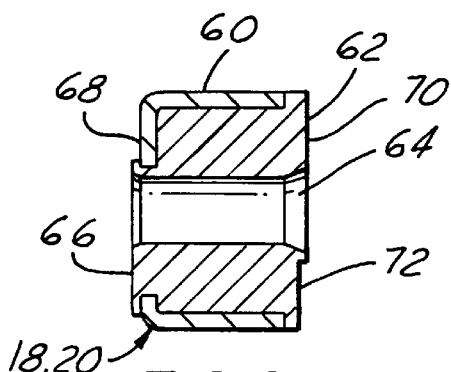
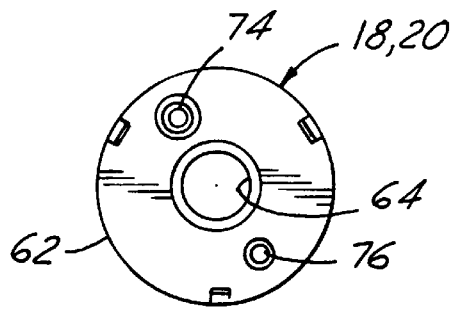
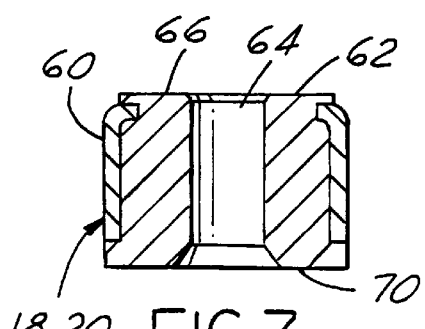
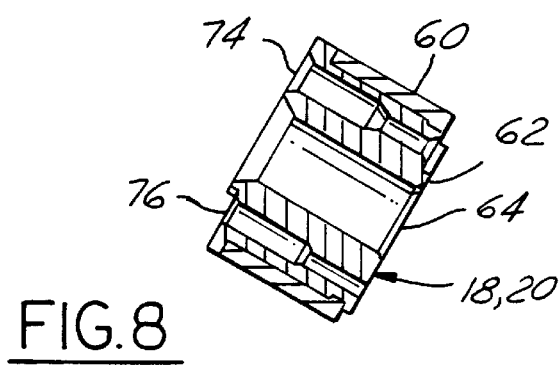

9A ↑

1

WIRE ROUTING DESIGN FOR A ROTOR OF AN ELECTRICAL MACHINE

BACKGROUND OF THE INVENTION

1. Field of the Invention

The present invention relates generally to rotors for electrical machines, and more specifically to routing of wire for field-generating coils of such rotors.

2. Description of the Related Art

In many electrical machines, a rotor includes an electromagnetic field generating coil which rotates with the rotor. In such machines, slip rings are typically provided as a part of the rotor assembly. The slip rings are means for connecting the field-generating coil to a source of electrical current.

Connection of the field generating coil to the slip rings can present reliability improvement opportunities in the design of a rotor for an electrical machine. For example, the two slip rings are typically manufactured as a single assembly, with two wires extending from the assembly. A first end of each wire is welded to a respective slip ring. A second end of each wire is welded to the wire which comprises the windings of the field-generating coil. The result is four interconnections between the field-generating coil and the slip rings. Although such designs have been honed to a relatively high degree of reliability, a reduction in the number of interconnections can improve reliability further.

An additional area of potential improvement in prior art designs is in the cost of the slip ring assembly. A typical slip ring assembly is manufactured by the aforementioned welding of wires to the copper slip rings, followed by insert-molding of this subassembly in plastic. The resulting slip ring assembly is a fairly expensive part, exhibiting considerable opportunity for cost reduction. An improved wire routing design from the field-generating coil to the slip rings may provide the ability to use more economical slip ring designs.

Therefore, wire routing designs for electrical machine rotors which can provide improved reliability and reduced cost can provide advantages over the prior art.

SUMMARY OF THE INVENTION

The present invention provides a rotor for an electrical machine. The rotor comprises a shaft defining an axis of rotation of the rotor, and first and second pole pieces affixed to the shaft for rotation therewith and together defining an interior cavity. The rotor additionally includes a slip ring affixed to the shaft for rotation therewith. Further, the rotor comprises a field-generating coil disposed within the interior cavity, the coil comprising a plurality of turns of electrical wire, the electrical wire further having a section extending to and electrically coupled to the slip ring. Also, the rotor has a retainer disposed exterior to the cavity and adjacent the first pole piece, the retainer comprising a radially-extending channel containing a portion of the section of electrical wire.

Designs according to the present invention can improve the reliability and reduce the cost of prior art designs. In doing so, the present invention provides advantages over the prior art.

BRIEF DESCRIPTION OF THE DRAWINGS

FIG. 3 is a perspective view of retainer 36 of rotor 10.

FIG. 4 is an end view of slip rings 18 and 20 of rotor 10.

FIG. 5 is an end view of the opposite end of slip rings 18 and 20 of rotor 10.

FIGS. 6–8 are cross-sectional views of slip rings 18 and 20 taken along lines 6—6, 7—7 and 8—8, respectively, of FIG. 4.

DETAILED DESCRIPTION OF THE PREFERRED EMBODIMENT

Figure 1:
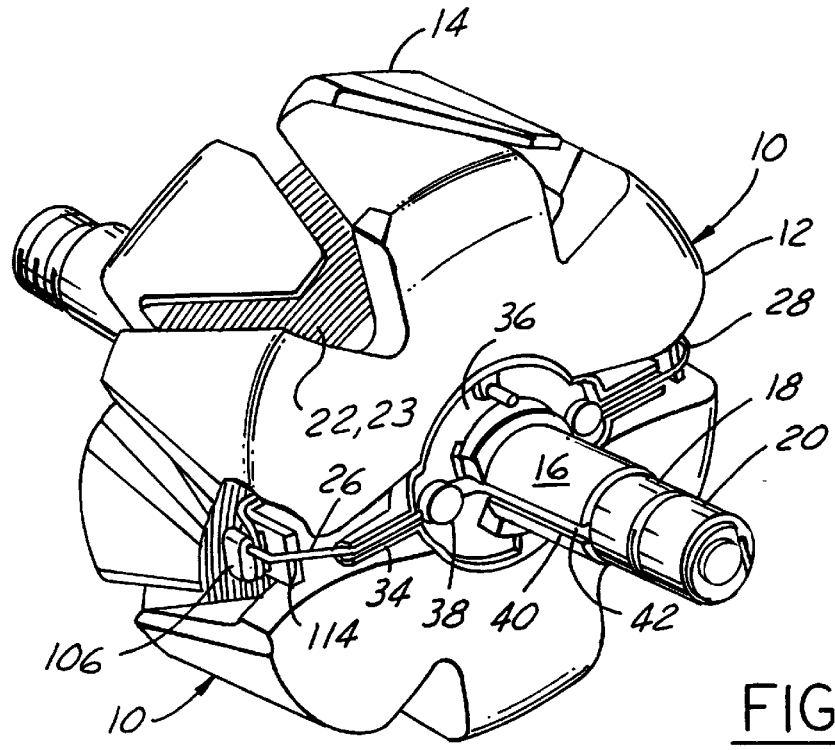
FIG. 1 is a perspective view of a rotor 10 according to one embodiment of the present invention.

Refer first to FIG. 1. A rotor 10 for an electrical machine includes a first pole piece 12 and a second pole piece 14 mounted on a shaft 16 for rotation therewith. Also mounted on shaft 16 for rotation therewith are slip rings 18 and 20. One will recognize rotor 10 as a rotor for an Lundell or "claw pole" alternator.

Mounted within the internal cavity formed by pole pieces 12 and 14 is a field coil 22. Field coil 22 comprises a plurality of turns of electrical wire 23 wound about a plastic bobbin. Wire sections 26 and 28 of electrical wire 23 are routed for electrical connection to slip rings 18 and 20, respectively. Preferably, wire 23 is continuous, with no electrical joints therein except for welded connections directly to slip rings 18 and 20. Details of the connections to slip rings 18 and 20 will be discussed below.

Figure 9:
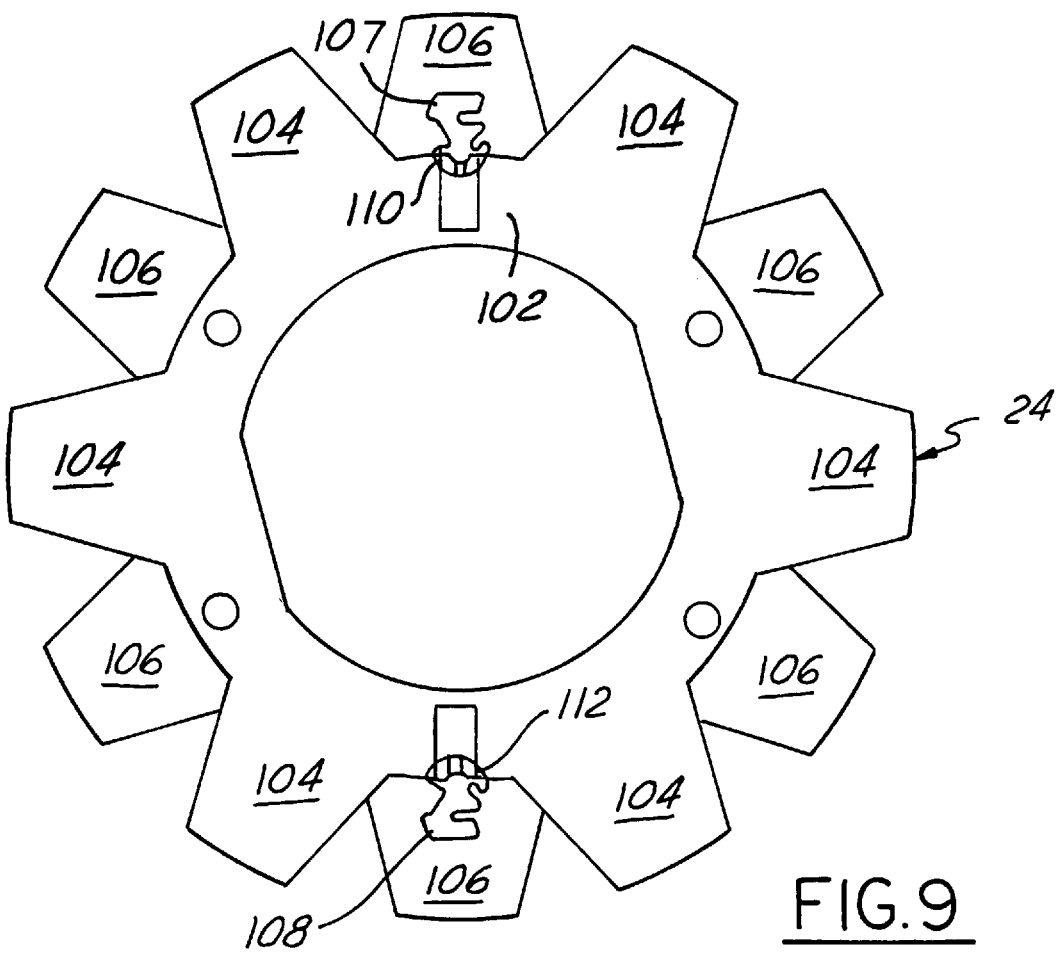
FIG. 9 is a front view of bobbin 24 of rotor 10.
Figure 9A:
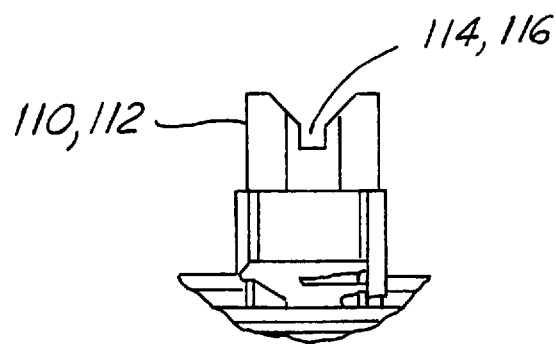
FIG. 9A is a partial view of bobbin 24, taken in the direction of arrow "A" of FIG. 9.

Refer additionally now to FIGS. 9 and 9A for a more detailed description of the bobbin 24 of field coil 22. Bobbin 24 is preferably molded of plastic and includes a generally cylindrical body with two radially-extending end walls. One such end wall is end wall 102, and the second end wall is obscured in FIG. 9 by end wall 102. As is known in the art, a series of flaps 104 extend radially from end wall 102, and a series of flaps 106 extend radially from the second end wall. When bobbin 24 is assembled in rotor 10, flaps 104 and 106 are bent over by the pole fingers of pole pieces 12 and 14, respectively, to electrically insulate the wire in field coil 22 from the metallic pole fingers. Extending radially from wall 102 and are "T"-shaped projections 107 and 108. Extending axially from wall 102 are axial projections 110 and 112. Axial projection 110 includes at its end a notch 114 and axial projection 112 includes at its end a notch 116.

Refer now particularly to FIG. 1. Routing of wire sections 26 and 28 to slip rings 18 and 20 is as follows. Wire section 26, after emerging from field coil 22, is wrapped around "T"-shaped projection 107 of bobbin 24. Wire section 26 is further located in notch 114. Wire section 26 further is also routed in a channel 34 of a retainer 36. Wire section 26 is also wound around a post 38 of retainer 36 (post 38 being subsequently heat-staked to retain wire section 26) and then routed through an axial groove 40 in shaft 16 for connection to slip ring 18. To prevent electrical short circuits between wire section 26 and shaft 16, an insulating woven sleeve 42 is slipped over wire section 26 where wire section 26 is routed in groove 40.

Wire section 28 is routed to slip ring 20 in an analogous manner to wire section 26.

Retainer 36 will now be described with more particularity, with additional reference to FIG. 3. Retainer 36 includes a generally annular body 50 and radially-extending channels 34 and 52. Also included are posts 38 and 54. Retainer 36 is preferably made of an electrically-insulating material and more preferably of a plastic suitable for heat-staking. As indicated above, wire sections 26 and 28 are wound about posts 38 and 54, respectively. Posts 38 and 54 are then heat staked to help retain wire sections 26 and 28.

Retainer 36 is preferably located in an axially-recessed portion of pole piece 12, such that radially-extending channels 34 and 52 are flush with or below surface 56 of pole piece 12. This facilitates attachment of a stamped fan, if desired, to surface 56. Such a fan may be attached, for example, by projection welding or spot welding. The fan may include complementary axially-projecting radial tunnels to accommodate radially-extending channels 34 and 52 and the portions of wire sections 26 and 28 therein. The tunnels may be particularly advantageous if the axially-recessed portion of pole piece 12 is not provided to locate radially-extending channels 34 and 52 below surface 56. Such tunnels in the fan may also include one or more holes through which epoxy or other adhesive may be introduced into the tunnels to add additional retention and electrical insulation to the portions of wire sections 26 and 28 which are located in radially-extending channels 34 and 52.

The construction of slip rings 18 and 20 will now be discussed with additional reference to FIGS. 4–8. Slip rings 18 and 20 are preferably identical, to provide economies of scale in their manufacture. Each slip ring includes a copper shell 60 and an injection-molded phenolic plastic body 62. Preferably, all of the copper of copper shell 60 is "integral"; that is, copper shell 60 is preferably formed in one piece, by drawing or by another suitable process. (Note: hereinafter, because slip rings 18 and 20 are preferably identical, features of slip rings 18 and 20 will be labelled with simple reference numerals, except where it becomes necessary to refer to a feature of a particular slip ring 18 or 20. In such an event, an alphabetic suffix will be added to the reference number, as follows: features of slip ring 18 will have an "A" suffix added, and features of slip ring 20 will have a "B" suffix added.) Plastic body 62 defines a bore 64 which accommodates a similarly-sized knurled end portion of shaft 16. As seen in FIG. 4, one end 66 of the slip ring has a pad region 68 which accommodates the welding of the end of the relevant wire section 26 or 28.

Preferably, the ends 66 and 70 of slip rings 18 and 20 are not planar. As can be seen best in FIG. 6, pad region 68 is recessed with respect to the remainder of end 66. Further, surface 72 of end 70 is recessed with respect to the remainder of end 70.

Slip rings 18 and 20 each have two through holes 74 and 76, each hole of diameter slightly larger than wire 23. Hole 74 is located adjacent to pad region 68.

Figure 2:
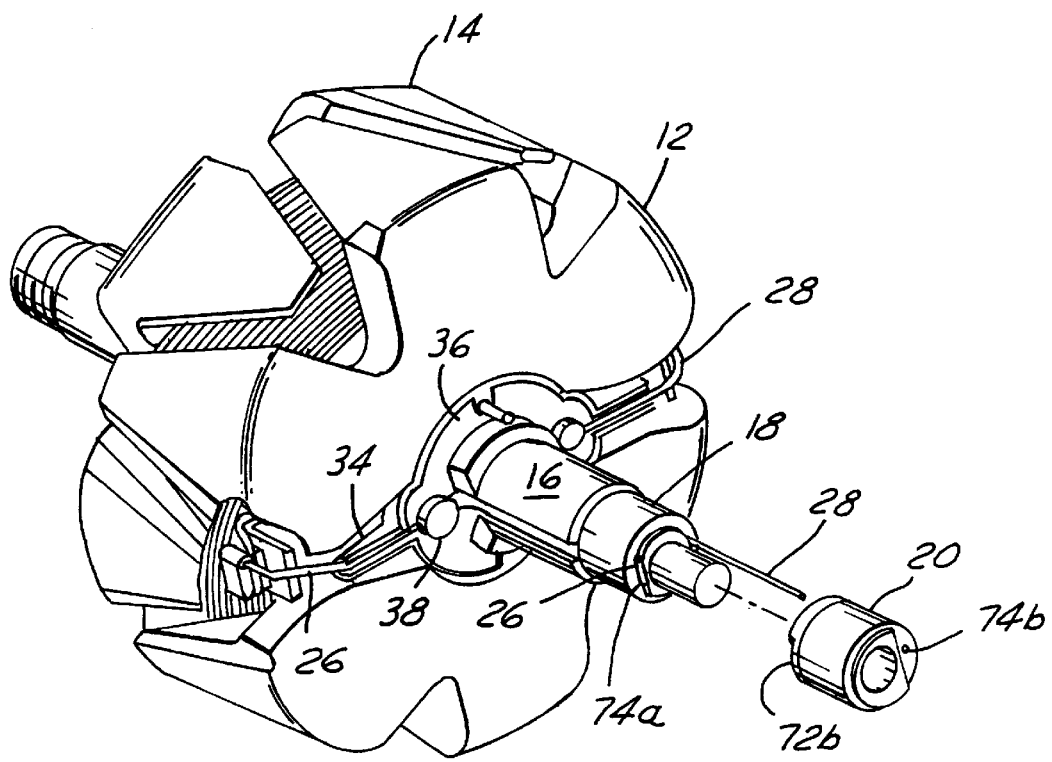
FIG. 2 is a partially-exploded view of rotor 10 of FIG. 1.

With additional reference to FIG. 2, the installation of slip rings 18 and 20 onto shaft 16 and the termination of wire sections 26 and 28 will now be described. Once wire sections 26 and 28 have been routed into their respective axial grooves on shaft 16, slip ring 18 is pressed onto shaft 16 with wire section 26 extending through hole 74A and wire section 28 extending through hole 76A. Wire section 26 is cut to length and ultrasonically welded to pad region 68A of slip ring 18. Wire section 28 extends through hole 76A of slip ring 18 without making electrical connection to slip ring 18.

Slip ring 20 is then pressed onto shaft 16 with wire section 28 extending through hole 74B of slip ring 20. Wire section 28 is then cut to length and welded to pad portion 68B of slip ring 20. One will note that as assembled, slip rings 18 and 20 are rotated 180 degrees with respect to one another about the axis of shaft 16. Pad portion 68A of slip ring 18 and surface 72B of slip ring 20 are thus aligned, allowing space to accommodate the end of wire section 26, which has been welded to pad portion 68A.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. A rotor for an electrical machine, said rotor comprising:

a shaft defining an axis of rotation of said rotor;

first and second pole pieces affixed to said shaft for rotation therewith and together defining an interior cavity;

a slip ring affixed to said shaft for rotation therewith;

a field-generating coil disposed within said interior cavity, said coil comprising a plurality of turns of electrical wire, said electrical wire further having a section extending to and electrically coupled to said slip ring; and a retainer disposed exterior to said cavity and adjacent said first pole piece, said retainer comprising a radially-extending channel containing a portion of said section of electrical wire;

wherein said retainer has a projection between said radially-extending channel and said slip ring, about said projection a second portion of said section of electrical wire is wrapped.

2. A rotor as recited in claim 1, wherein said projection is deformed to retain said second portion of electrical wire.

3. A rotor as recited in claim 2, wherein said radially-extending channel is located in an axially-recessed portion of said first pole piece.

4. A rotor as recited in claim 2, wherein said retainer comprises a generally annular body disposed about said shaft, said radially-extending channel extending from said body.

5. A rotor as recited in claim 4, wherein said first pole piece has at least one axially-recessed portion in which said radially-extending channel and said body are disposed.

6. A rotor as recited in claim 4, wherein:

said field-generating coil further comprises a bobbin about which said turns of electrical wire are disposed;

said bobbin comprises an axially-extending projection including a notch, in which a third portion of said section of electrical wire is routed.

7. A rotor as recited in claim 6, wherein a fourth portion of said section of electrical wire is routed in an axially-extending channel in said shaft and said fourth portion is covered with an insulating sleeve.

8. A rotor as recited in claim 7, wherein said bobbin further comprises a radially-extending extension about which a fifth portion of said section of electrical wire is wrapped.

9. A rotor as recited in claim 1, wherein:

said rotor further comprises a second slip ring affixed to said shaft for rotation therewith;

said electrical wire comprises a second section extending to and electrically coupled to said second slip ring;

said retainer comprises a second radially-extending channel containing a portion of said second section of electrical wire;

wherein said retainer has a second projection between said second radially-extending channel and said second slip ring, about said second projection a second portion of said second section of electrical wire is wrapped.

10. A rotor as recited in claim 9, wherein said projection and said second projection are deformed to retain said second portion of said section of electrical wire and said second portion of said second section of electrical wire.

11. A rotor as recited in claim 10, wherein said first pole piece has at least one axially-recessed portion in which said radially-extending channel and said second radially-extending channel are disposed.

* * * * *